United States Patent
Diorio et al.

(10) Patent No.: US 9,928,390 B1
(45) Date of Patent: *Mar. 27, 2018

(54) NETWORK-ENABLED RFID TAG ENDORSEMENT

(71) Applicant: Impinj, Inc., Seattle, WA (US)

(72) Inventors: Christopher J. Diorio, Shoreline, WA (US); Larry Arnstein, Seattle, WA (US); Scott A. Cooper, Seattle, WA (US)

(73) Assignee: IMPINJ, INC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,212

(22) Filed: Jun. 23, 2016

Related U.S. Application Data

(63) Continuation of application No. 14/677,219, filed on Apr. 2, 2015, now Pat. No. 9,405,945, which is a continuation-in-part of application No. 13/441,285, filed on Apr. 6, 2012, now Pat. No. 9,024,729.

(60) Provisional application No. 61/473,501, filed on Apr. 8, 2011.

(51) Int. Cl.
*G06K 7/00* (2006.01)
*G06K 7/10* (2006.01)
*H04W 12/06* (2009.01)

(52) U.S. Cl.
CPC ..... *G06K 7/10128* (2013.01); *G06K 7/10227* (2013.01); *H04W 12/06* (2013.01); *H04L 2209/805* (2013.01)

(58) Field of Classification Search
CPC .......... G06K 7/10227; G06K 7/10128; H04W 12/06; H04L 2209/805

USPC ....................................................... 340/10.3
See application file for complete search history.

(56) References Cited

U.S. PATENT DOCUMENTS

| | | |
|---|---|---|
| 5,467,081 A | 11/1995 | Drews et al. |
| 6,842,106 B2 | 1/2005 | Hughes et al. |
| 7,450,010 B1 | 11/2008 | Gravelle et al. |
| 7,532,104 B2 | 5/2009 | Juels |
| 7,734,046 B2 | 6/2010 | Urban et al. |
| 7,791,451 B2 | 9/2010 | Lei et al. |
| 8,049,594 B1 * | 11/2011 | Baranowski .......... H04L 9/3271 340/10.1 |
| 8,154,405 B2 | 4/2012 | Gravelle et al. |

(Continued)

OTHER PUBLICATIONS

Notice of Allowance received for U.S. Appl. No. 14/602,173 dated May 10, 2017, 9 pages.

(Continued)

*Primary Examiner* — Edwin Holloway, III
(74) *Attorney, Agent, or Firm* — Turk IP Law, LLC

(57) ABSTRACT

A Radio Frequency Identification (RFID) reader may be configured to endorse an RFID tag. The reader receives an identifier from the tag and challenges the tag with a challenge. After receiving a response from the tag, the reader sends a first message including at least the identifier, challenge, and response to an authenticating entity and sends a second message including at least the identifier to a certifying entity. The reader then receives a first reply from the authenticating entity and a second reply from the certifying entity. The second reply may include a certificate associated with the tag, or may identify some property of the tag or an item associated with the tag. In some embodiments, the reader may serve as the authenticating and/or certifying entity.

20 Claims, 10 Drawing Sheets

(56) References Cited

U.S. PATENT DOCUMENTS

| | | | |
|---|---|---|---|
| 8,373,786 B2* | 2/2013 | Otsuka | G02B 5/201 257/294 |
| 8,378,786 B2 | 2/2013 | Bailey et al. | |
| 8,595,506 B2 | 11/2013 | Robshaw et al. | |
| 8,866,594 B1 | 10/2014 | Diorio et al. | |
| 9,024,729 B1* | 5/2015 | Diorio | 340/10.1 |
| 9,111,283 B1 | 8/2015 | Diorio et al. | |
| 9,405,945 B1* | 8/2016 | Diorio | G06K 7/10227 |
| 2006/0077034 A1* | 4/2006 | Hillier | G06Q 20/32 340/5.61 |
| 2006/0187048 A1* | 8/2006 | Curkendall | A01K 11/007 340/572.4 |
| 2007/0106897 A1* | 5/2007 | Kulakowski | G06F 21/35 713/171 |
| 2008/0258864 A1 | 10/2008 | Hattori et al. | |
| 2009/0219132 A1 | 9/2009 | Maytal et al. | |
| 2010/0001840 A1* | 1/2010 | Kang | H04Q 9/00 340/10.1 |
| 2012/0200386 A1 | 8/2012 | Robshaw et al. | |
| 2013/0043982 A1 | 2/2013 | Robshaw et al. | |

OTHER PUBLICATIONS

Fina Office Action received for U.S. Appl. No. 14/106,522, dated Apr. 7, 2017, 17 pages.

Office Action for U.S. Appl. No. 13/441,285 dated Aug. 12, 2014 and filed Apr. 6, 2012.

Final Office Action received for U.S. Appl. No. 13/308,123, dated May 22, 2014 and filed Nov. 30, 2011.

Office Action received for U.S. Appl. No. 13/308,123, dated Oct. 8, 2013 and filed Nov. 30, 2011.

"Non-Final Office Action Issued in U.S. Appl. No. 14/602,173" Dated Feb. 15, 2017, 17 Pages.

Notice of Allowance received for U.S. Appl. No. 14/106,522 dated Nov. 30, 2017.

* cited by examiner

NETWORK-ENABLED RFID TAG ENDORSEMENT

CROSS REFERENCE TO RELATED APPLICATIONS

This application is a continuation under 35 U.S.C § 119 of U.S. patent application Ser. No. 14/677,219 filed on Apr. 2, 2015, which is a continuation-in-part under 35 U.S.C § 120 of U.S. patent application Ser. No. 13/441,285 filed on Apr. 6, 2012, which claims benefit under 35 U.S.C § 119(e) of U.S. Provisional Application Ser. No. 61/473,501 filed on Apr. 8, 2011. The disclosures of the aforementioned patent application and provisional application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are particularly useful in product- and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag generates the transmitted back RF wave either originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna system, a radio section, a power management section, and frequently a logical section, a memory, or both. In some RFID tags the logical section may include a cryptographic algorithm which, in many instances, relies on one or more passwords or keys stored in tag memory. In earlier RFID tags the power management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device such as a battery, and are called passive tags. Of course, even passive tags typically include temporary energy- and data/flag storage elements such as capacitors or inductors.

Counterfeiting is a problem in many areas of global commerce. Many RFID-enabled applications need to verify the authenticity of the RFID tags, readers, and system components used in the application, and also need to verify attributes of the items to which the tags are attached. For example, a retailer receiving a shipment of tagged garments may need to verify whether the tags, and by implication the garments to which the tags are attached, are authentic; the retailer may also need to verify attributes of the garments, such as that they were manufactured with organic cotton.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID reader, or an RFID system that includes a reader, endorsing an RFID tag. The reader receives an identifier from the tag and challenges the tag with a challenge. After receiving a response from the tag, the reader then sends a first message including at least the identifier, challenge, and response to an authenticating entity and sends a second message including at least the identifier to a certifying entity. The reader then receives a first reply from the authenticating entity and a second reply from the certifying entity. The second reply may include a certificate associated with the tag, or may identify some property of the tag or an item associated with the tag. In some embodiments, the reader may serve as the authenticating and/or certifying entity.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

Figure 1:
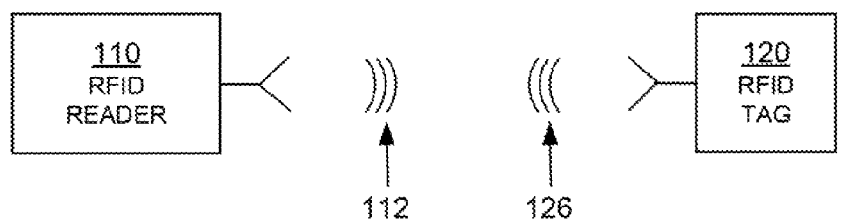
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Embodiments are directed to a Radio-Frequency Identification (RFID) system endorsing an RFID tag. Endorsement includes but is not limited to authenticating the RFID tag to determine the legitimacy of the tag and/or the object to which the tag is attached, and validating one or more certificates that embody assertions that the tag and/or the object to which the tag is attached possess one or more properties.

The tag includes a secret, also known as a key, which may not readable but is known to an authenticating entity. The tag also includes an identifier (ID) such as but not limited to a tag identifier (TID), key identifier (KID), unique item identifier (UII), electronic product code (EPC), or a serialized trade identification number (SGTIN). Finally, the tag includes or provides a means for a reader to determine one or more certificates embodying tag or item properties such as: make and model; country of origin; size; weight; region of sale; labor practices; farming practices; energy usage; hazardous or non-hazardous; approval by NGOs, governments, laboratories, or other organizations; allergens; safety; customer satisfaction ratings; IP licensure, or other similar properties.

To authenticate a tag (i.e., determine the tag's legitimacy), the reader interrogates the tag to determine the tag's ID, challenges the tag with a random number or string, then receives a response from the tag. The tag may then be authenticated based on the ID, challenge, and response by an authenticating entity, which may be the reader, an authentication module associated with the reader, and/or a separate authenticating entity. In some applications each individual RFID tag or group of tags will contain a distinct key, and the authenticating entity may determine the key a particular tag employs by using the ID as a table lookup or input to an algorithmic key generator. The tag computes its response from at least the challenge and the key, typically using a cryptographic algorithm. In some applications the tag may add some tag-generated randomness to the challenge to enhance the security of the challenge-response algorithm. Because the authenticating entity must be able to reconstruct the challenge that the tag used in its computations, in these latter applications the tag either sends its tag-generated randomness to the authenticating entity, or provides sufficient information in its ID and response for the authenticating entity to determine the tag-generated randomness algorithmically. In some applications, to further enhance security, the tag may encrypt its tag-generated randomness in an Initial Value (IV) and send the IV to the authenticating entity. In yet other applications the authenticating entity will generate the challenge and send it to the reader for relaying to the tag.

The authenticating entity uses the challenge and its knowledge of the tag's key and cryptographic algorithm to confirm or refute the tag's response and thereby ascertain the tag's or item's authenticity. In some applications, such as a consumer using an RFID-enabled mobile phone to interrogate a product (like a designer purse) prior to purchase, the authenticating entity will send a reply to the phone indicating whether the item is authentic or counterfeit. In other applications, such as a pharmaceutical distributor using an RFID-enabled handheld reader to interrogate a shipment (such as a case of medicine), the authenticating entity may send a notification to a designated party such as the distributor's security office or, in some instances, directly to the police in the event of counterfeit medicine.

To truly authenticate a tag, a recipient of a message from an authenticating entity needs to know that the message is genuine, from a trusted authenticating entity, and has not been forged or altered by an illegitimate authenticating entity or during transmission. Accordingly, in some embodiments the authenticating entity signs the message using an electronic signature, and the receiving entity verifies the signed message, for example by using a public or private key of the authenticating entity.

In some embodiments, tags may be associated with certificates that embody one or more assertions about the tag or tagged product. In one example, a tag may store at least one certificate, and may send the certificate to an interrogating reader. In another example, a tag may store at least one assertion about itself or its associated product, and may send the assertion to an interrogating reader, and the reader may then construct a certificate based on the received assertion. In yet another example, a tag may send its tag ID to an interrogating reader, and the reader may use the tag ID to look up assertions or certificates associated with the tag.

A certificate, in addition to including or designating one or more assertions or properties of the tag or tagged item, may also include the name or location (for example, a uniform resource locator or URL that identifies an internet or network address) of a certifying entity that can support, provide, or refute the assertions and/or properties. A certifying entity may validate a tag certificate, which provides assurances that the tag certificate is in fact genuine. The certifying entity, similar to the authenticating entity described above, may include a reader, a certification module associated with the reader, and/or a separate certifying entity. A reader that is a certifying entity may, upon receiving a certificate or other identifying information from a tag, validate the certificate and/or look up certificates or assertions associated with the tag. On the other hand, a reader that is not a certifying entity may, upon receiving a certificate from a tag or constructing a certificate based on information from a tag, send the certificate to a certifying entity for validation. The certifying entity may then respond with a message either supporting (i.e., confirming) or refuting the certificate and may also send a message to one or more designated parties.

In some embodiments, a certifying entity may provide tag certificates or assertions about a tag or tagged product. For example, a certifying entity may, upon receipt of identification information for a tag, look up or generate certificates or assertions associated with the tag. For example, a reader that is not itself a certifying entity may send a tag ID to a certifying entity. The certifying entity may then use the tag ID to determine if any certificates or assertions are associated with the tag or associated product. The certifying entity may perform the determination by using the tag ID as a table lookup for certificates or assertions, or as an input to an algorithmic generator that produces certificates or assertions. If the reader is a certifying entity, then the reader may itself determine if any certificates or assertions are associated with the tag or associated product.

As with authentication, the reader or designated party may need to know that a message from a certifying entity is genuine, from a trusted certifying entity, and has not been forged or altered by an illegitimate certifying entity or during transmission. Accordingly, in some embodiments the certifying entity signs the certifying message using an electronic signature, and the receiving entity verifies the signed message such as by using a public or private key of the certifying entity.

A reader that (a) confirms that a tag is authentic and genuine, and (b) confirms that some certification about properties of the tag or tagged item (or properties of the production process for the tag or tagged item) is genuine can then ascertain that the tag or tagged item possesses the properties. In some applications, such as a consumer using an RFID-enabled mobile phone to interrogate a product (like a designer purse) prior to purchase, the certifying entity may send a message indicating that the purse was made without using child labor. In other applications, such as a pharmaceutical distributor using an RFID-enabled handheld reader to interrogate a shipment (such as a case of medicine), the certifying entity may send a notification to a designated party such as the distributor's security office or, in some instances, directly to the police in the event of a mismatched property such as an incorrect port-of-origin.

In some applications the authenticating entity and the certifying entity are the same entity. For example, the reader itself may be both the authenticating entity and the certifying entity. If not, in some embodiments the reader may send tag information to the combined authenticating/certifying entity. In some embodiments, the authenticating entity and/or the certifying entity may be used to route certifying and/or authenticating information to the other. For example, the reader may send the ID, challenge, response, and certifying information solely to the authenticating entity, which in turn routes the ID and certificates to appropriate certifying entities. As another example, the reader may send the ID, challenge, response, and certifying information solely to the certifying authority, which in turn routes the ID, challenge, and response to an appropriate authenticating entity. Routing may include altering, reorganizing, reformatting, combining, or splitting apart one or more messages prior to transmission.

In some applications the certifying entity may pre-register certificates at a authenticating entity in advance, so that the authenticating entity can act as a proxy for the certifying entity and support or refute assertions about a tag without having to route a message to the certifying entity. Similarly, in some applications the certifying entity may be able to act as a proxy for the authenticating entity and confirm or refute tag authenticity without having to route a message to the authenticating entity.

For both the authenticating entity and the certifying entity, the network may be available in real-time, meaning that the reader and entities can engage on a message-by-message basis, or the network may be non-real-time, meaning that messages are stored and transmitted when the network is available.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
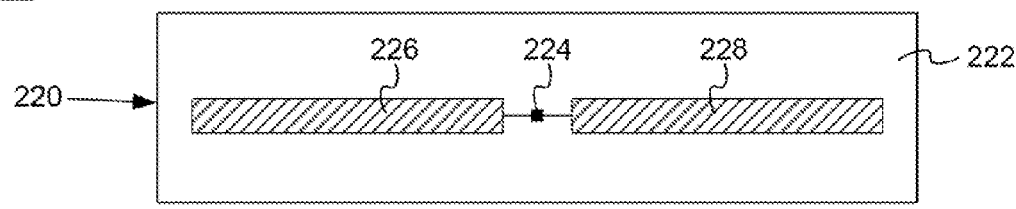
FIG. 2 is a diagram showing components of a passive RFID tag, such as a tag that can be used in the system of FIG. 1.
Figure 2:
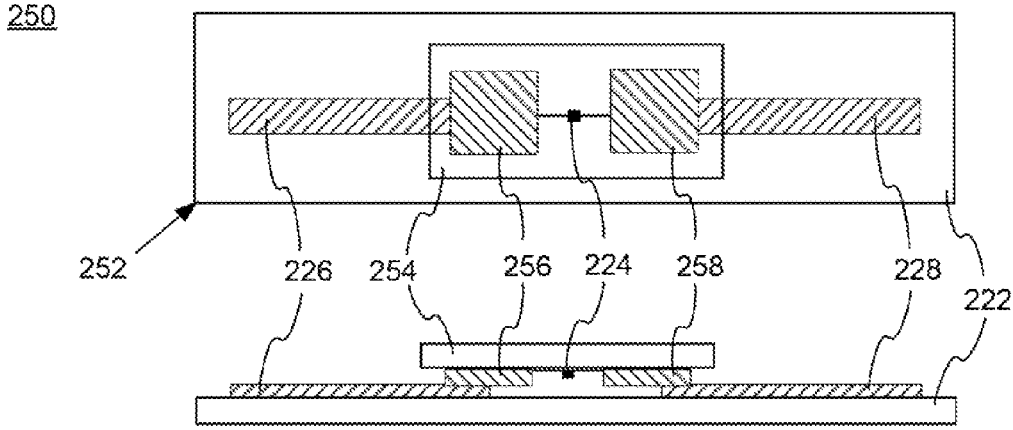
Figure 2:
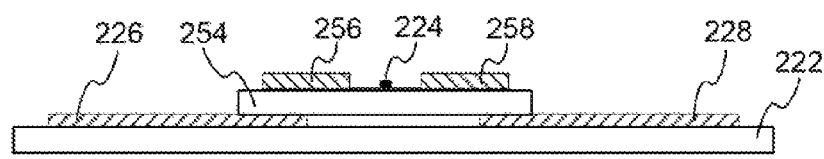

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
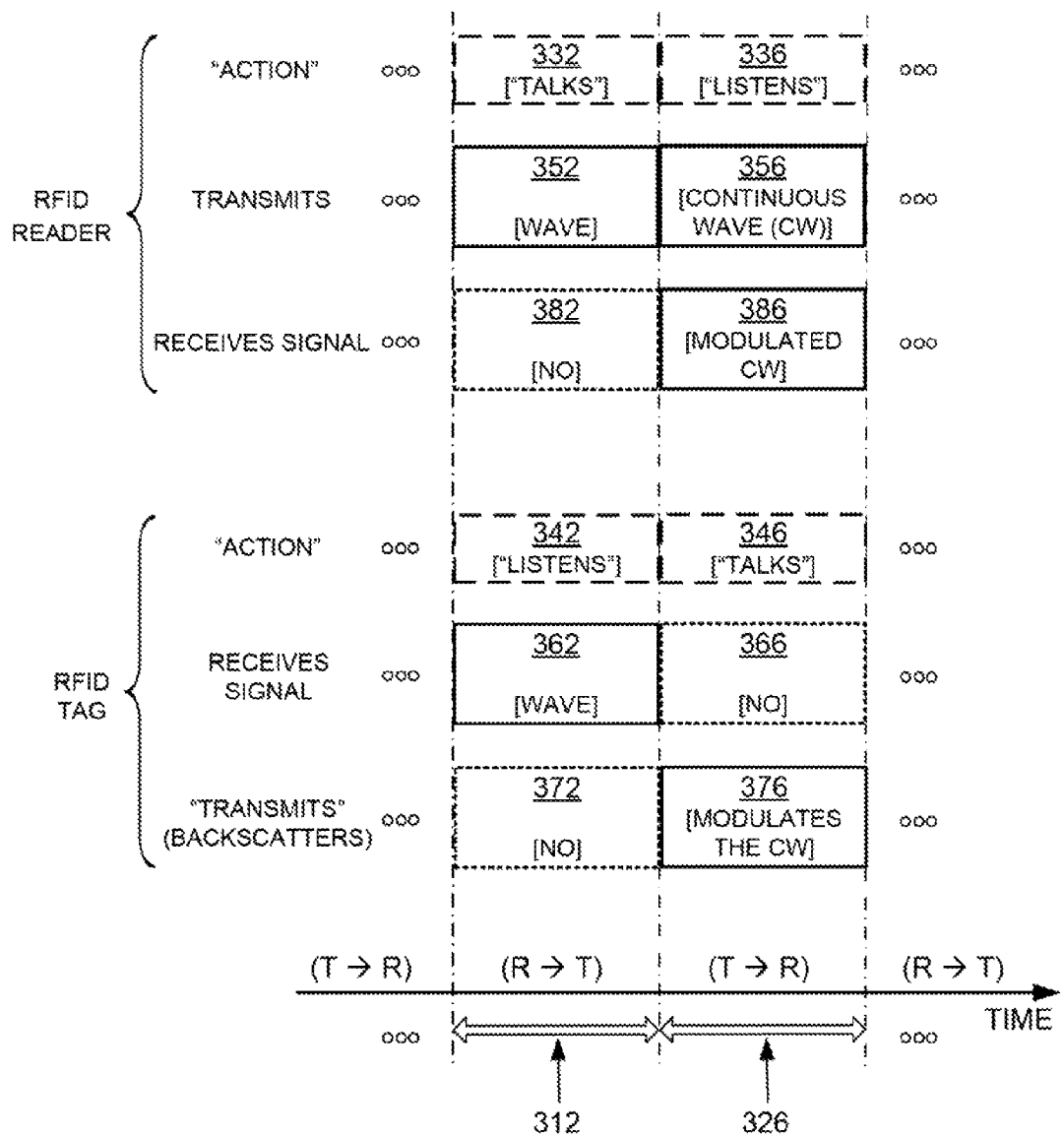
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

An order, a timing, and other parameters of RFID tag/reader communications may be defined by industry and/or government protocols (also known as standards). For example, the Class-1 Generation-2 UHF RFID Protocol for Communications at 860 MHz-960 MHz ("Gen2 Specification") by EPCglobal, Inc. is one such industry standard. The contents of the Gen2 Specification versions 1.2.0 and 2.0 are hereby incorporated by reference.

Figure 4:
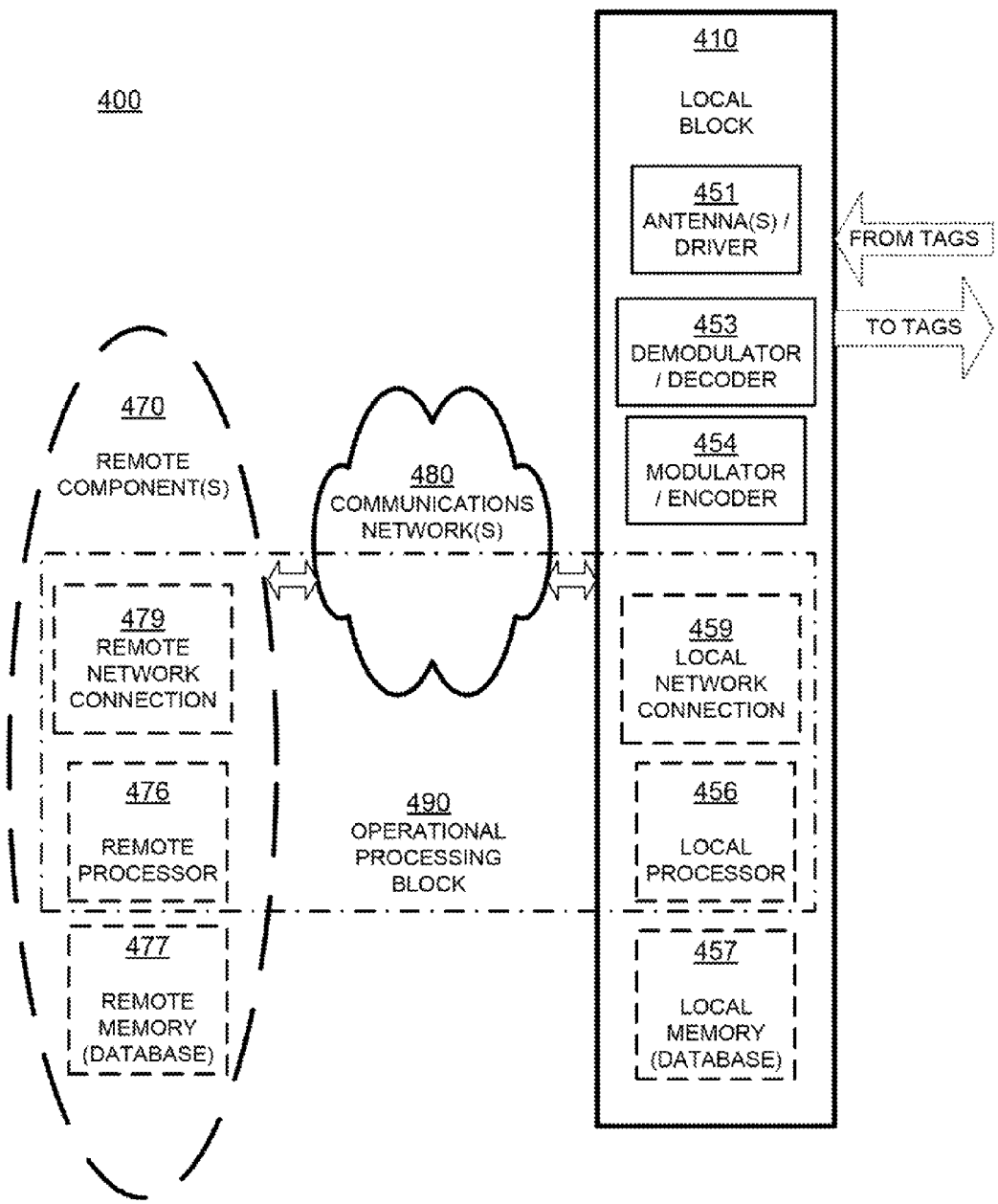
FIG. 4 is a block diagram showing a detail of an RFID reader system.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer, programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authentication function; in some cases one or more of these functions can be distributed among other blocks such as encoding block 454, or may be entirely incorporated in another block.

Local block 410 additionally includes an optional local memory 457. Local memory 457 may be implemented in any number of ways known in the art, including, by way of example and not of limitation, any of the memory types described above as well as any combination thereof. Local memory 457 can be implemented separately from local processor 456, or in an IC with local processor 456, with or without other components. Local memory 457, if provided, can store programs for local processor 456 to nm, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to EPCs, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. Local block 410 may include a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an authentication function, similar to local processor 456.

Remote component(s) 470 can also include a remote memory 477. Remote memory 477 can be made in any way known in the art, such as was described with reference to local memory 457. Remote memory 477 may include a local database, and a different database of a standards organization, such as one that can reference EPCs. Remote memory 477 may also contain information associated with commands, tag profiles, keys, or the like, similar to local memory 457.

Of the above-described elements, it may be useful to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna/driver 451, and cause antenna/driver 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna/driver block 451, with modulator/encoder block 454 encoding and modulating the information on an RF wave. Then data is received from the tags via antenna/driver block 451, demodulated and decoded by demodulator/decoder block 453, and processed by operational processing block 490.

Embodiments of an RFID reader system can be implemented as hardware, software, firmware, or any combination. Such a system may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
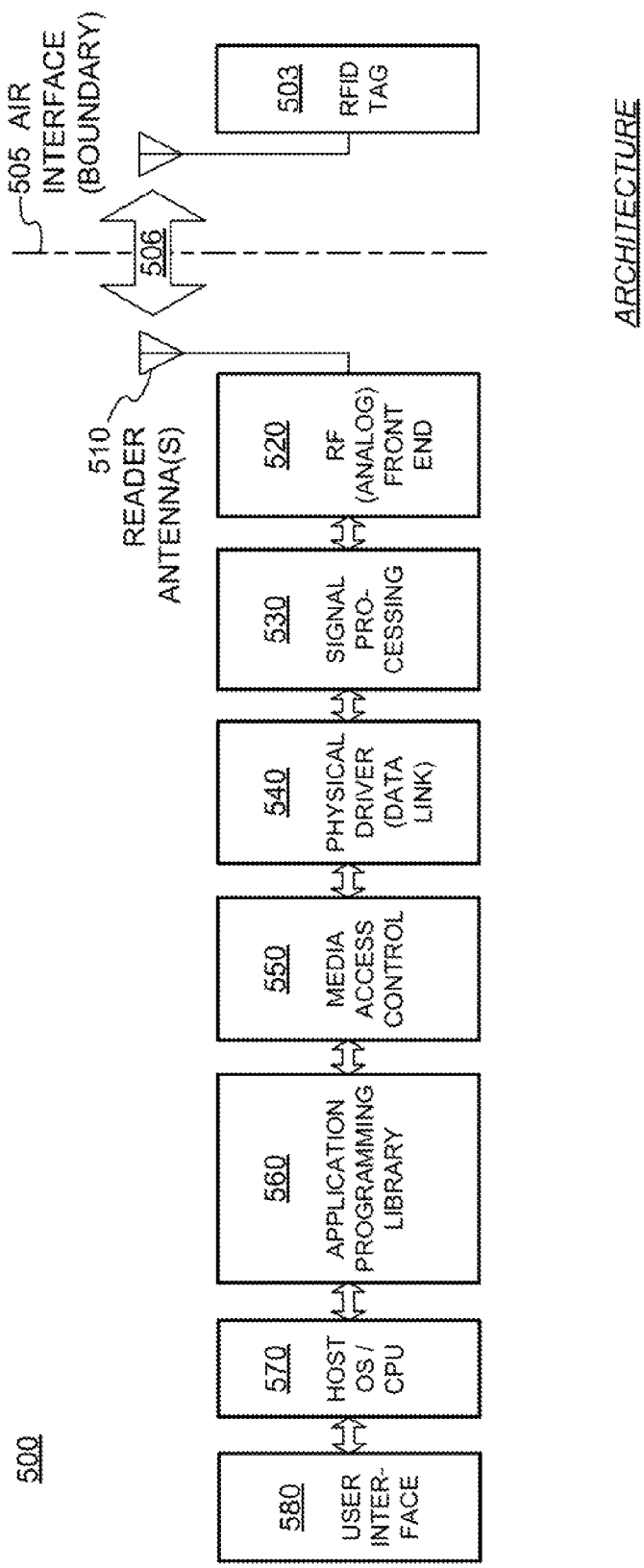
FIG. 5 is a block diagram illustrating an overall architecture of an RFID system according to embodiments.

FIG. 5 is a block diagram illustrating an overall architecture of an RFID system 500 according to embodiments. RFID system 500 may be subdivided into modules or components, each of which may be implemented by itself or in combination with others. In addition, some of them may be present more than once. Other embodiments may be equivalently subdivided into different modules. Some aspects of FIG. 5 are parallel with systems, modules, and components described previously.

An RFID tag 503 is considered here as a module by itself. RFID tag 503 conducts a wireless communication 506 with the remainder, via the air interface 505. Air interface 505 is really a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550. In one embodiment, media access control layer module 550 exchanges packets of bits with physical driver module 540. Media access control layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to a Radio-Frequency Identification (RFID) system endorsing an RFID tag. Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 6:
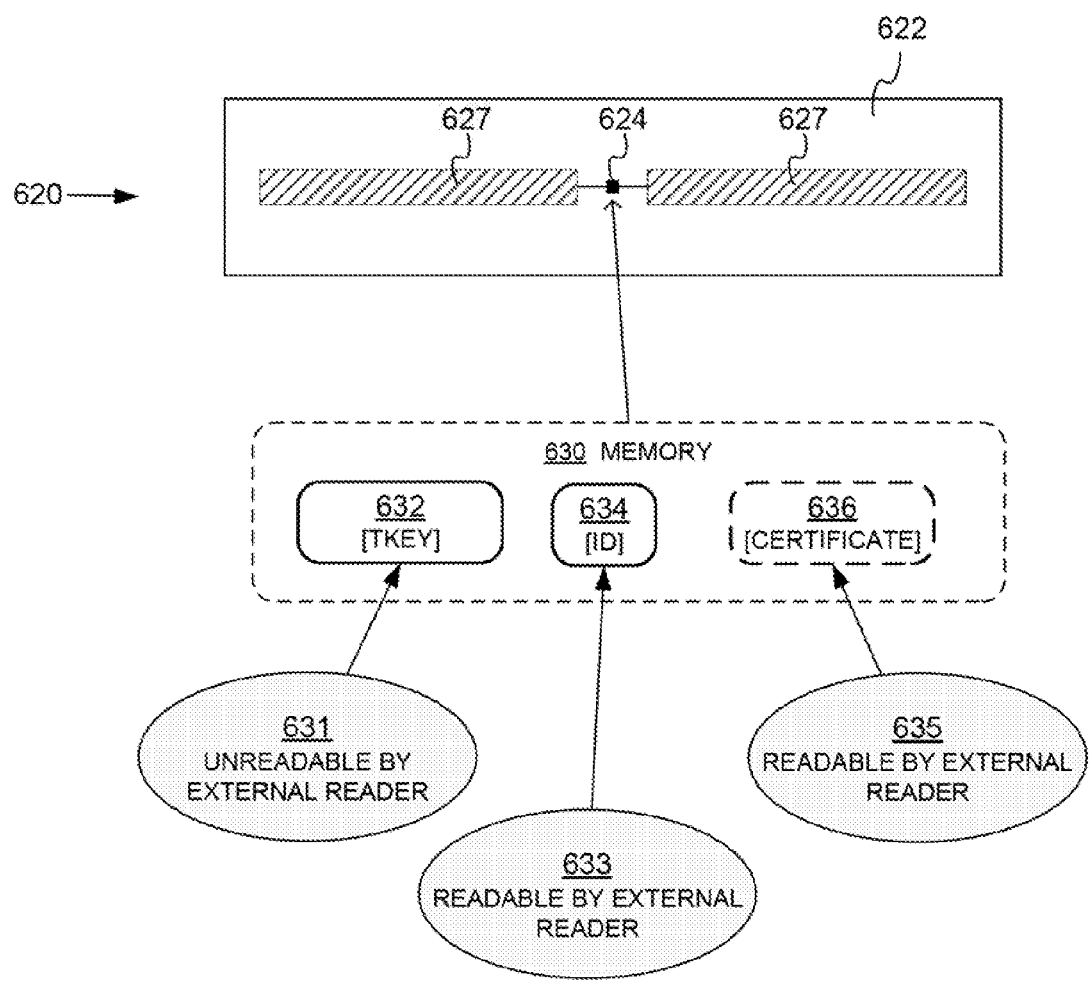
FIG. 6 illustrates an RFID tag configured to store an identifier, one or more certificates, and one or more keys according to embodiments.

FIG. 6 illustrates a tag 620 configured to store a tag key (TKEY) 632, an identifier (ID) 634, and an optional certificate 636 according to embodiments. Tag 620, similar to tag 220 depicted in FIG. 2, includes an IC 624 (similar to IC 224 in FIG. 2) with a tag memory 630 configured to store the tag key 632, the ID 634, and the optional certificate 636, and may also be configured to store any other suitable data. Tag key 632, which is used for cryptographic operations by tag 620, is stored in a portion 631 of the tag memory 630 that is not readable by an external device such as a reader. In some embodiments, each individual RFID tag or group of tags may store a unique tag key.

In contrast, the ID 634, which may identify the tag, an item to which the tag is attached, or both, is stored in a portion 633 of tag memory 630 that is readable by an external device. For example, the ID 634 may include a tag identifier (TID), a key identifier (KID), a unique item identifier (UII), an electronic product code (EPC), a serialized trade identification number (SGTIN), or any other suitable identifier or identification code.

Similarly, optional certificate 636 may be stored in a portion 635 of tag memory 630 that is readable by an external device. If present, certificate 636 embodies one or more assertions that the tag and/or its attached product possess one or more properties. For example, the optional certificate 636 may indicate a make/model, a country of origin, size, weight, region of sale, whether the product is hazardous, whether it has been approved by one or more entities (nongovernmental organizations (NGOs), governments, laboratories, or any other suitable organization), whether it contains allergens, whether it meets safety standards, customer satisfaction ratings associated with the product, whether it meets all relevant IP licensure requirements, or other similar properties.

The optional certificate 636 may also indicate properties about the production of the tag/product. For example, the optional certificate 636 may indicate labor or farming practices associated with production (e.g., no child labor used, free-range/organic, fair trade, etc.) or energy used during production.

Figure 7:
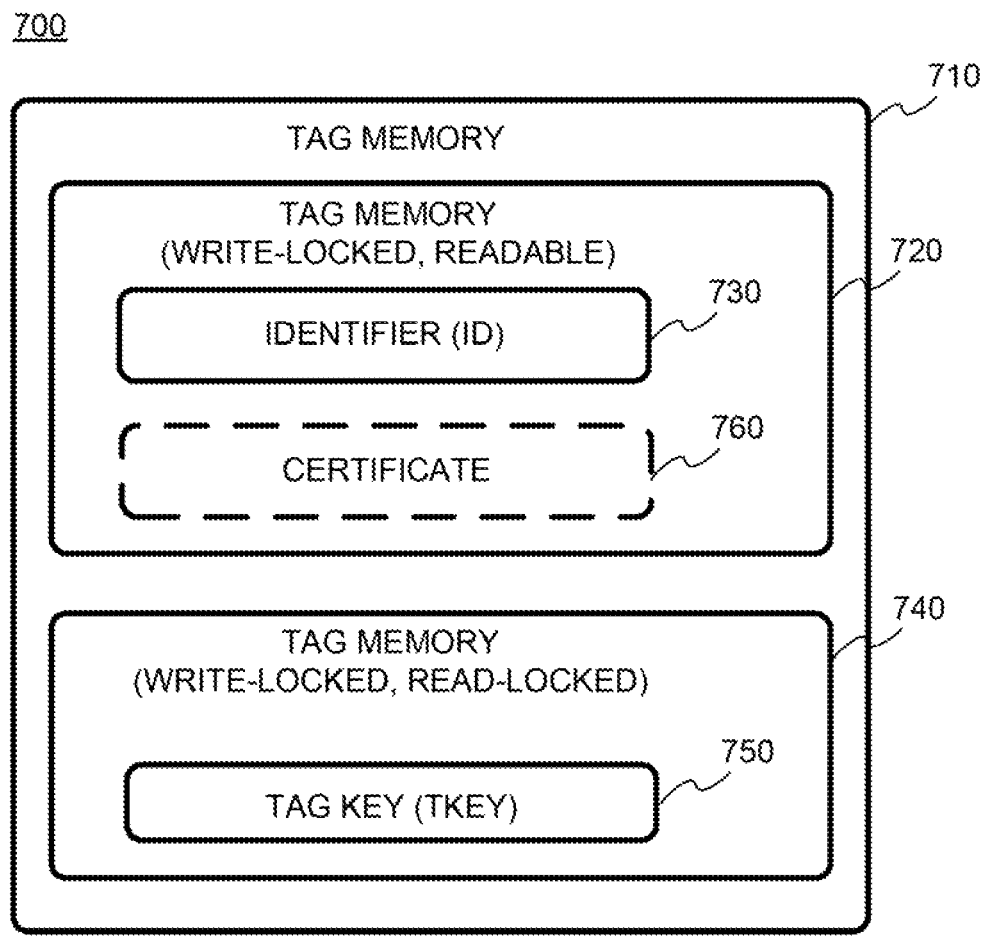
FIG. 7 illustrates a tag memory configuration according to one embodiment.

FIG. 7 depicts the configuration of a tag memory 710 according to one embodiment. Tag memory 710 is similar to tag memory 630 (FIG. 6), and includes at least two tag memory portions 720 and 740. Whereas in some embodiments the tag memory portions 720 and 740 may be portions of a single memory bank or physical memory, in other embodiments the portions 720 and 740 may each comprise separate memory banks, multiple memory banks, or multiple physical memories.

Tag memory portion 720, as with memory portion 633 (FIG. 6), is configured to store ID 730 (similar to ID 634 in FIG. 6) and optional certificate 760 (similar to optional certificate 636 in FIG. 6) and be readable by an external device such as a reader. Tag memory portion 720 can be further configured to be unwriteable ("write-locked"), such that an external device cannot write to it, thereby preventing damage to or loss of the ID 730 and/or the certificate 760.

Tag memory portion 740 is similar to memory portion 631 (FIG. 6) in that it is configured to store TKEY 750 (similar to TKEY 632 in FIG. 6) and usually is unreadable by an external device. As with tag memory portion 720, tag memory portion 740 can also be configured to be unwriteable, thereby preventing damage to or loss of the TKEY 750. In some embodiments ID 730, optional certificate 760, and/or TKEY 750 may be encrypted.

At some point in time, ID 730 (and optional certificate 760 if present) was written into tag memory portion 720 and TKEY 750 was written into tag memory portion 740. For example, a tag manufacturer may generate ID 730 and write it into tag memory portion 720 when the tag was manufactured or soon afterward. Similarly, the tag manufacturer may write the TKEY 750 into tag memory portion 740, either at the same time as ID 730 or at some other time. The optional certificate 760 may also be written by the tag manufacturer in the same way, although in some embodiments the optional certificate 760 is written by the product manufacturer/retailer at a later time. Alternatively, the tag supplier, authenticating/certifying entity, or even another entity can perform the writing. Although tag memory portions 720 and 740 are shown as unwriteable ("write-locked") in FIG. 7, the tag manufacturer, product manufacturer/retailer, or other entity may write the ID 730, optional certificate 760, and/or the TKEY 750 before rendering the tag memory portions unwriteable, or may write the data in some other way (e.g., via direct physical access to the memory portions).

In some embodiments, a reader may be able to reconfigure the tag in order to replace the ID 730, the optional certificate 760, and/or TKEY 750 written in tag memory portions 720 and 740 with a different ID, certificate, or TKEY. For example, the tag memory portions 720/740 may be configured to be unwriteable by readers without proper authorization but writeable by readers having proper authorization. Thus, an authorized reader may be able to write a new ID, certificate, and/or TKEY into the tag memory portions 720/740.

Figure 8:
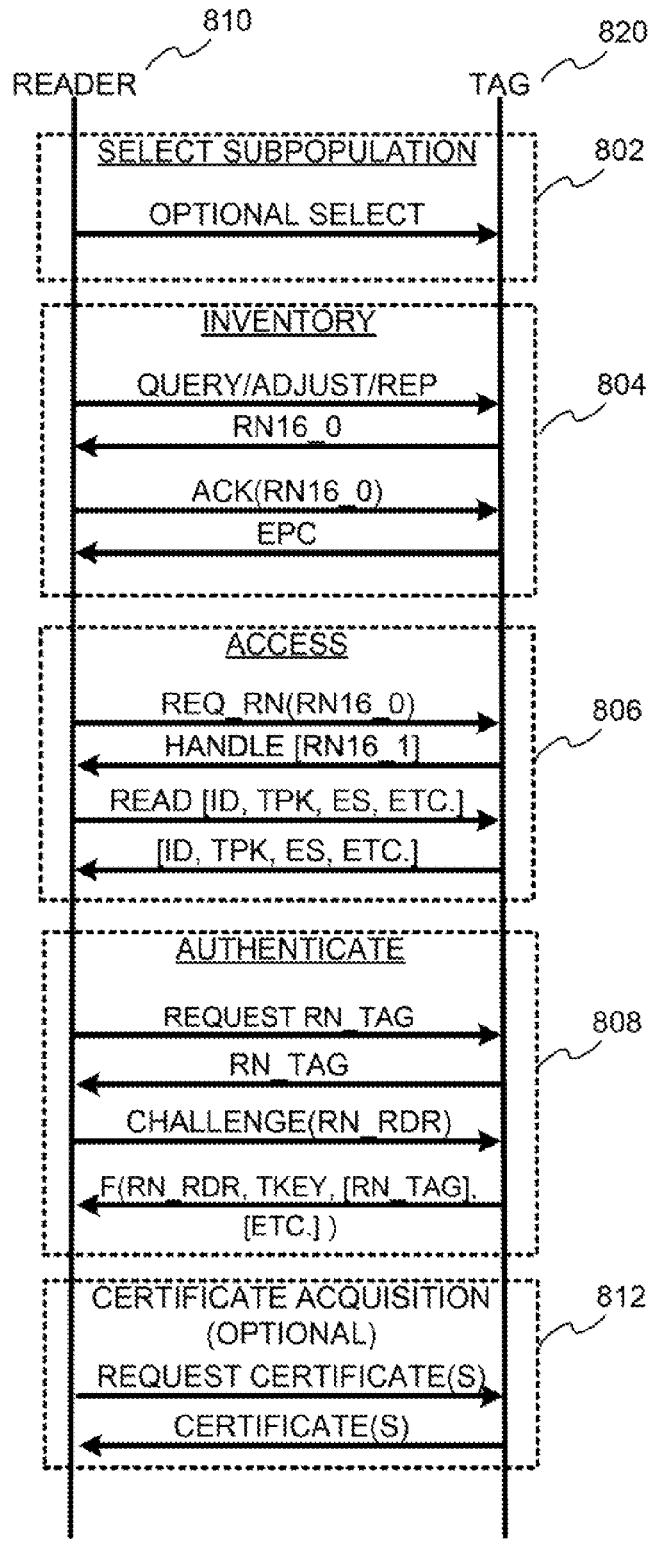
FIG. 8 illustrates a sequence of communications signals between a reader and a tag according to embodiments.

FIG. 8 illustrates command-response exchanges 800 between a reader 810 and a tag 820 according to embodiments. The sequence of signals proceeds downward chronologically (i.e., lower signals occur later), with signals from the reader 810 to the tag 820 indicated by arrows pointing right and signals from the tag 820 to the reader 810 indicated by arrows pointing left. Although the commands and responses in diagram 800 of FIG. 8 assume that the reader 810 and tag 820 are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 8. Other orderings are possible; exchanges can be merged, enhanced, or eliminated; and the authentication can be spread across various operations between reader and tag.

The interactions between reader 810 and tag 820 in diagram 800 begin with an optional tag subpopulation selection 802, where the reader 810 selects one or more tags from a tag population for inventorying and/or authentication. For example, the reader 810 may broadcast a selection command that includes one or more criteria to the tag population. The criteria in the selection command may include one or more tag flag values, at least a portion of a tag identifier, and/or at least a portion of other data that can be stored on tags. Tags in the population that meet the one or more criteria, for example having tag flag values and/or stored data that match the tag flag value(s) and/or data specified in the selection command may be considered as "selected". In some embodiments, the selection command may be the Select command of the Gen2 Specification.

Reader 810 then performs an inventory 804 to singulate an individual tag from the tag population (or from within a subpopulation of selected tags, if the reader performed optional tag selection 802). In some embodiments, the reader performs the inventory 804 according to the Query-ACK sequence described in the Gen2 Specification. In the Gen2 Query-ACK sequence, a reader first transmits a Query/QueryAdj/QueryRep command. A tag that meets the criteria for responding may then reply with a 16-bit random/pseudorandom number RN16_0. Upon receipt of the RN16_0, the reader transmits an Acknowledge command (ACK) with the RN16_0 to the tag, which may then respond with its EPC.

After performing the inventory 804, the reader then performs an access 806 in order to access and read tag information from the tag singulated in inventory 804. The tag may store (and the reader may access) an identifier ID, which may be the tag's EPC or another tag identifier, a tag public key TPK corresponding to the TKEY if TKEY is a private key, an electronic signature ES associated with the ID, EPC, and/or TPK, and optionally one or more other parameters, such as a tag random number. The reader may begin the access 806 by transmitting a REQ_RN command with the RN16_0 received in inventory 804, which requests a new random/pseudorandom number from the tag for use as a tag handle. The tag then responds with a RN16_1 handle. The reader then transmits a read request to read one or more of the optional ID, TPK, ES, and any other optional parameters. Upon receiving the read command sent by the reader, the tag transmits the requested information to the reader.

The reader then challenges the tag in an authentication step 808. In the authentication step 808, the reader may first optionally request a tag random number RN_TAG from the tag, which may be used to enhance the security of authentication step 808. RN_TAG may have been previously stored in the tag, generated in situ, or generated in situ and then stored in the tag. In some embodiments the tag may generate RN_TAG using its TKEY or by reading a tag random number that was previously stored in tag memory. After generating RN_TAG, the tag transmits it to the reader. The tag may encrypt the RN_TAG before transmission. In some embodiments, the tag may generate an initial value (IV) based on RN_TAG and TKEY and transmit the IV to the reader in addition to or instead of RN_TAG.

The reader then transmits a challenge to the tag. A challenge is a message that contains a random number (which may be encrypted) and one or more cryptographic parameters. The challenge instructs a receiving entity, such as a tag or reader, to determine a cryptographic response based on the random number, the cryptographic parameter(s), and entity information such as an entity key, an entity identifier, or any other suitable entity information. The receiving entity may itself compute the cryptographic response using a cryptographic algorithm, or may have another entity compute and provide the cryptographic response to the receiving entity. The challenge may be determined based on the random number and/or an entity random number. A challenge may originate from another tag, a reader, or some other entity. In the situation described in diagram 800, the challenge originates from the reader, includes a reader random number RN_RDR, and may also include the RN_TAG (or IV if used).

Upon receiving the challenge, the tag computes a response to the challenge based on the RN_RDR, the TKEY, other cryptographic parameters included in the challenge, the RN_TAG or IV, the tag handle (RN16_1), another tag random number such as the RN16_0, and/or any other suitable parameter. In some embodiments, the tag may use a tag random number different from the RN_TAG originally sent to the reader to generate the response. For example, the tag random number used to generate the response may be derived from RN_TAG based on some algorithm or may be entirely independent of RN_TAG. The tag then sends the computed response to the reader.

At this point, the tag's response may be verified by an authenticating entity. The authenticating entity, which may be the reader and/or a separate entity, has some knowledge about the interrogated tag(s). For example, the authenticating entity may know the tag key TKEY and/or the encryption algorithm(s) used by the tag(s). The authenticating entity, if not the reader, may be known to the reader a priori, or the reader may query a network or a tag for its identity.

At this point the authenticating entity may be able to verify the tag's response using the RN_RDR, the RN_TAG/IV, the tag ID, and/or any other previously-received or known parameter. For example, if the reader is an authenticating entity, it may verify the tag's response. The reader may instead (or also) send the challenge, the received tag response, and other information to another authenticating entity for f.

The authenticating entity, whether the reader or a separate entity, may then determine the tag key TKEY and/or the particular encryption algorithm used by that tag (e.g., by looking it up based on the received tag ID) and use the determined TKEY/encryption algorithm, along with the original reader-tag challenge and tag RN_TAG/IV (if any), to decrypt or verify the tag response. If the authenticating entity is able to decrypt/verify the tag response based on its knowledge of the tag (e.g., TKEY/encryption algorithm), then the authenticating entity confirms the tag response and thereby corroborates the tag's (or attached item's) authenticity.

In situations where the reader is not the authenticating entity, the authenticating entity may generate the challenge and send it to the reader for transmission to the tag. In this case, the reader may not transmit the original reader challenge back to the authenticating entity along with the tag response, tag IV, and the tag ID, because the authenticating entity already knows the challenge used. Optionally, the authenticating entity may generate and provide a random number (e.g., the reader random number or an entirely different random number) for the reader to use to generate the challenge.

As described above, in some embodiments the tag's TKEY may be a private key, and the tag may provide a corresponding TPK and an ES associated with the TPK and generated by a signing authority. The authenticating entity may obtain the signing authority's master public key via a network or other means and use the master public key to verify the ES, thereby verifying the TPK. In some embodiments, the authenticating entity may use an ID from the tag to identify the signing authority and/or the master public key.

Subsequently, the authenticating entity may send a challenge (which may include the reader random number RN_RDR) to the tag, receive a tag response to the challenge, and verify the received tag response using the TPK. The tag may also provide a tag-generated parameter, such as a random number, for use in verifying the tag response. In some embodiments, the authenticating entity may encrypt the RN_RDR in the challenge using the TPK, receive a tag response with a decrypted random number, and attempt to verify the tag response by comparing the RN_RDR with the decrypted random number. In other embodiments, the authenticating entity may include a plaintext RN_RDR in the challenge, receive a tag response with an encrypted random number, and attempt to verify the tag response by decrypting the encrypted random number and comparing RN_RDR with the decrypted random number.

In some embodiments, reader 810 may request one or more certificates from tag 820 in an optional certificate acquisition step 812. As mentioned above, certificates may include or designate one or more assertions or properties about a particular tag or tagged item. In optional certificate acquisition step 812, reader 810 requests and receives one or more certificates from tag 820. In some embodiments, the tag 820 may not store certificates, and the reader 810 may use the tag ID received in step 806 (or previously, if the tag ID is the tag EPC) to construct and/or look up the certificate(s).

In some embodiments, a certifying entity may be used to validate one or more certificates associated with the tag. The reader itself may be the certifying entity, or the reader may interact with the certifying entity indirectly (e.g., through an authenticating entity) or directly. The certifying entity may be known to the reader or authenticating entity a priori, or may be determined via a network query. In some embodiments, a tag may store the identity of a certifying entity suitable for certification, and the reader may read the certification information from the tag and use it directly or pass it on to the authenticating entity.

As mentioned above, the commands and signals in sequence 800 do not have to be performed in the particular order shown, or even grouped as shown. The commands and signals may be separated, combined, or interspersed among each other. For example, in some embodiments the reader sends a challenge during tag selection 802, preceding the access 806, and the tag computes its response and stores the response in memory for subsequent reading by a reader. The tag's computation may also include a tag random number (e.g., RN_TAG, an IV, the tag handle, and/or RN16_0) or other tag parameter, and the tag may store the tag random number and/or the tag parameter for subsequent access by the reader. Indeed, in embodiments where the challenge occurs during tag selection, and reading the response occurs during tag access, authentication 808 need not exist, because its operations have been spread among select 802 and access 806.

One reason a reader may choose to send the challenge with select 802 is for multiple tags to hear the challenge and compute their cryptographic responses in parallel. Because cryptographic computations can be time intensive, enabling multiple tags to compute their responses in parallel allows more rapid authentication of a population of tags. In some embodiments, the challenge itself may be sent to multiple tags simultaneously, separately from select 802. In some embodiments, a challenge that is transmitted to an individual tag may be an Authenticate command of the Gen2 Specification, and a challenge that is broadcast to multiple tags may be a Challenge command of the Gen2 Specification.

In some embodiments, an interrogated tag may transmit its tag ID with its response to a reader challenge, instead of providing its tag ID in inventory 804 or access 806. The tag may transmit its tag ID with its response as consecutive messages, or may concatenate the response with the tag ID, for example by prepending the response with the tag ID, appending the tag ID to the tag response, or otherwise combining the tag ID and the response in the same message. Similarly, the certificate may be concatenated with the ID, or the certificate may be concatenated with the response, or the certificate, ID, and response may all be concatenated together. In some embodiments, the concatenation may occur in the context of a "Gush" command as described in commonly-assigned U.S. patent application Ser. No. 13/423,256, filed on Mar. 18, 2012 and entitled "RFID TAGS THAT BACKSCATTER MORE CODES", hereby incorporated by reference in its entirety.

As another example, the reader may send the request for the tag random number during the optional tag selection 802. Because the select signal in tag selection 802 is broadcast to a population of tags, multiple tags may receive the reader's tag random number request. In response, each tag that receives the tag random number request may generate its own tag random number and then store the tag random number in tag memory. The reader may then subsequently read each tag (e.g., in access 806) to retrieve the stored tag random number.

Whereas authenticate step 808 in sequence 800 includes a tag random number, in some embodiments step 808 may not use or include a tag random number. In some embodiments, a tag authentication may include a command count (e.g., a count from the reader indicating the number of commands it has transmitted or a count from the tag indicating the number of commands it has received) and/or an electronic signature. Electronic signatures may include digital signatures generated via asymmetric cryptographic techniques and/or message authentication codes generated via symmetric cryptographic techniques. Other authentication steps may include more or fewer steps than the particular authenticate step 808 shown in sequence 800.

Figure 9:
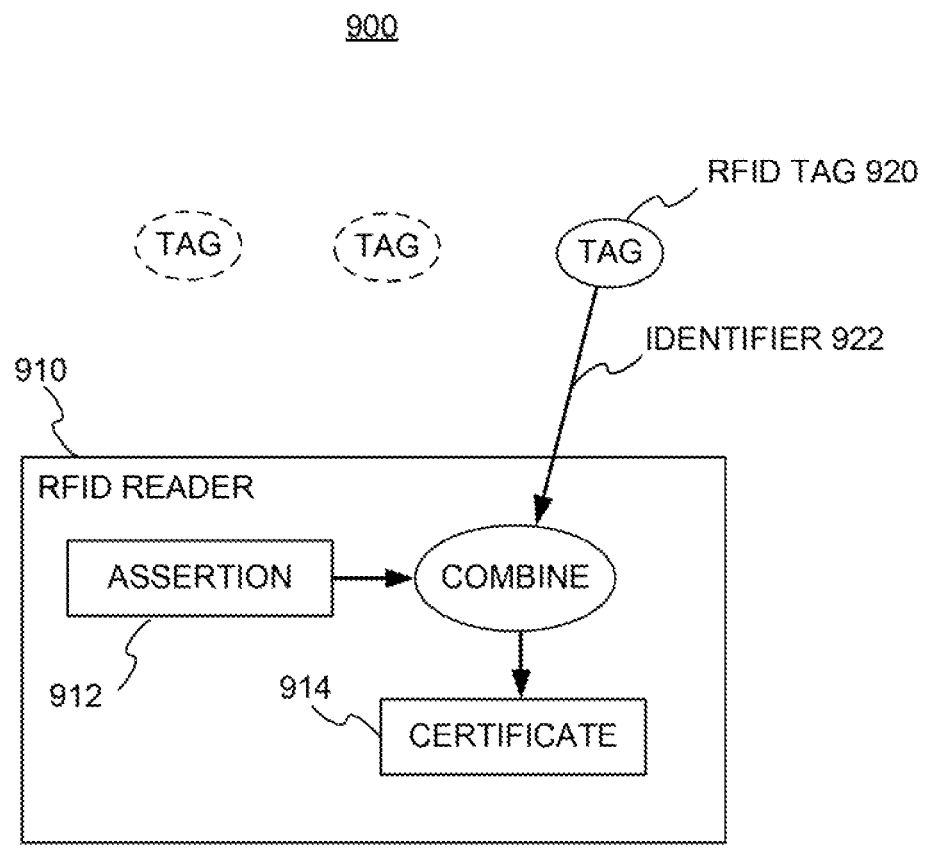
FIG. 9 is a diagram illustrating how a reader may construct a certificate based on an identifier received from a tag according to embodiments.

As described above, a certificate may include or designate assertions about or properties of a tag or tagged item. Certificates may be requested from a tag, an authenticating entity, and/or a certifying entity. In some embodiments, a reader, authenticating entity and/or certifying entity may construct tag certificates based on a tag identifier. FIG. 9 depicts a diagram 900 of how a reader may construct a certificate based on a tag identifier according to embodiments.

As shown in diagram 900, reader 910 may be able to access one or more assertions 912 regarding potential properties of a tag or of the product to which the tag is attached, similar to those that would be embodied in a certificate stored in a tag. When the reader 910 receives an identifier 922 from a tag 920, it may combine the identifier 922 with the one or more assertions 912 to construct a certificate 914. For example, reader 910 may construct certificate 914 by concatenating identifier 922 and assertions 912 (e.g., by appending or prepending identifier 922 with assertions 912). In some embodiments, reader 910 may construct certificate 914 by using identifier 922 and assertions 912 as inputs into a certificate generation algorithm, which in turn may combine identifier 922 and assertions 912 (for example, using one or more arithmetic and logical operations) to form certificate 914.

The assertions 912 may be locally-stored on the reader 910 as shown in FIG. 9, may be stored on the product to which the tag is attached, may be stored on a display or sign associated with the product, or may be stored on a remote server accessible to the reader 910 via a network. The assertions may be stored in human-readable form (e.g. a "certified organic" logo), scan-readable form (e.g. 1-D barcode, 2-D barcode, or similar symbology), or machine-readable form (e.g. values stored in a memory or database). These assertions can be any of the product attributes described above that are embodied in certificates, such as organic, vegan, vegetarian, make and model, country of origin, child-free labor, green energy usage, etc.

While in FIG. 9 reader 910 constructs tag certificate 914 from identifier 922 and assertions 912, in other embodiments reader 910 may transmit identifier 922 and/or assertions 912 to a certifying entity, or may itself be a certifying entity. The certifying entity may then either construct and validate certificate 914 itself, or may use the received identifier 922/assertions 912 to determine whether assertions 912 about the tag identified by identifier 922 are valid.

Figure 10:
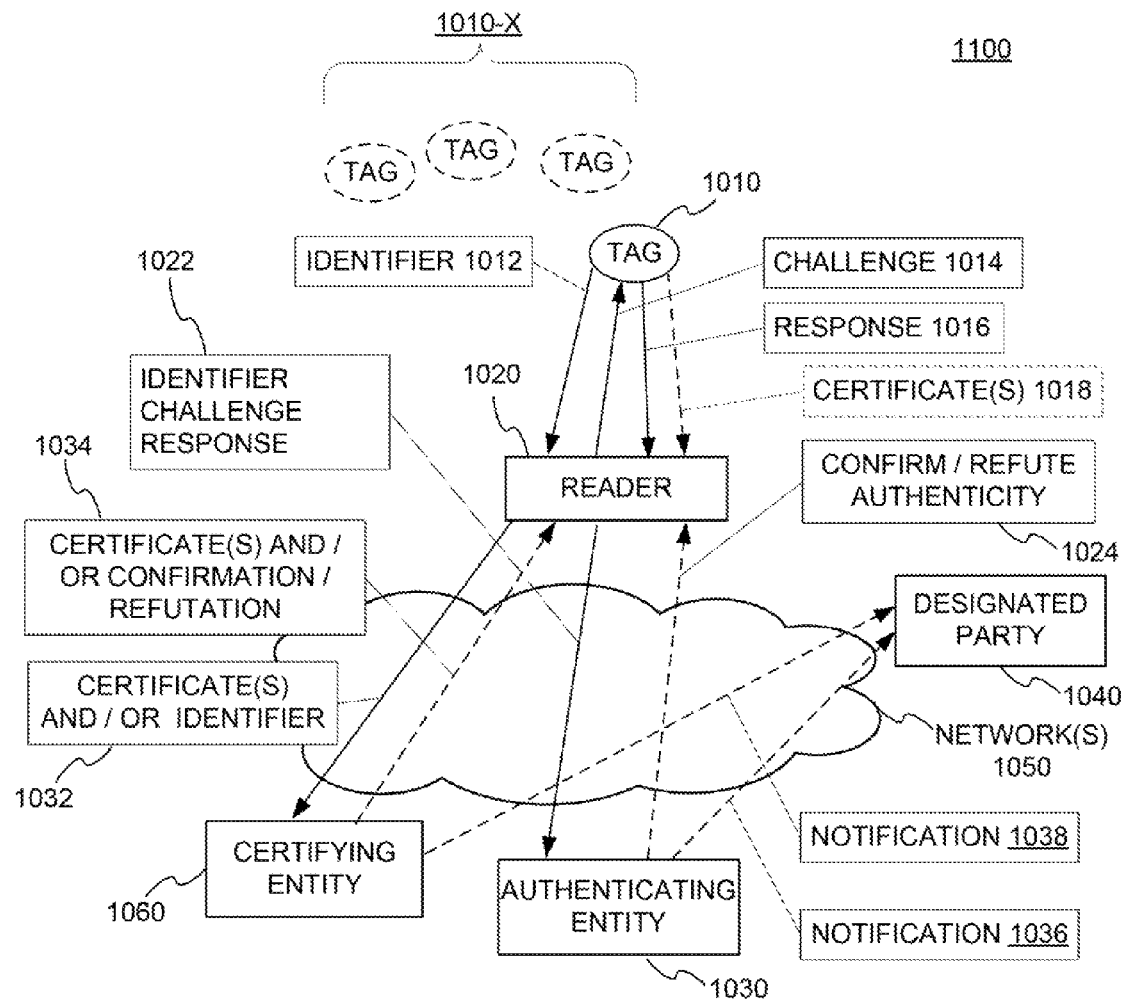
FIG. 10 is a diagram depicting interactions between an RFID reader, RFID tags, an authenticating entity, a certifying entity, and a designated party according to one embodiment.

FIG. 10 is a diagram 1000 depicting interactions between an RFID reader 1020, RFID tags 1010-X and 1010, an authenticating entity 1030, a certifying entity 1060, and a designated party 1040 according to one embodiment.

In diagram 1000, reader 1020 is communicating with a number of tags 1010-X and 1010. In particular, reader 1020 has singulated tag 1010 and receives its identifier 1012 (e.g., an EPC or other identifier such as ID 634/730 in FIGS. 6/7). Reader 1020 then transmits a challenge 1014 (e.g., the challenge in challenge-response step 808, FIG. 8) to the tag 1010. The tag 1010, which stores a secret (e.g., a tag key, such as TKEY 632/750 in FIGS. 6/7), generates a response 1016 (e.g., the F( ) response in challenge-response step 808, FIG. 8) based on its stored secret (and optionally tag-generated randomness). The tag 1010 then transmits its response 1016 to reader 1020.

In some embodiments, the tag 1010 also optionally transmits one or more certificates 1018 to the reader 1020, either because the reader 1020 explicitly requests the certificate(s) or because the tag 1010 is configured to transmit the certificate(s) when responding to reader challenges. In other embodiments, instead of receiving certificates 1018 from tag 1010, reader 1020 may use identifier 1012 to look up certificates associated with tag 1010, or may construct one or more certificates based on the identifier 1012.

In diagram 1000, reader 1020 is not an authenticating or certifying entity. Accordingly, reader 1020 may communicate with a separate authenticating entity 1030 and/or a separate certifying entity 1060 over one or more networks 1050. In embodiments where reader 1020 is an authenticating and/or certifying entity, reader 1020 itself may perform the operations described below for authenticating entity 1030 and/or certifying entity 1060.

In order to authenticate tag 1010, reader 1020 transmits (1022) the identifier, the challenge, the response, and optionally any indicators of tag-generated randomness (e.g., a tag random number or IV) to authenticating entity 1030. The authenticating entity 1030 stores or has access to information about the tag 1010, such as its secret and/or the encryption algorithm it uses. The authenticating entity 1030 then uses this information, the received identifier, challenge, and response to determine if the tag is authentic. For example, in one embodiment, the authenticating entity 1030 may use the received identifier to find and access a local copy of the tag's stored secret/key, compute a response from the secret/key and the received challenge, and compare the computed response with the actual, received tag response. If the two responses match then the tag is authentic, and if the responses do not match then the tag is not authentic. The authenticating entity 1030 may then optionally send a message 1024 (which may be electronically signed by the authenticating entity 1030) to the reader 1020 via network(s) 1050 confirming or refuting the authenticity of the tag (or the item it is attached to).

Reader 1020 may also communicate with certifying entity 1060 in order to ascertain if tag 1010 and/or an associated item possess any particular certified properties. To do so, reader 1020 may transmit (1032) the identifier and any received or constructed certificates to certifying entity 1060. Tag 1010 or certificates 1018 may identify certifying entity 1060 (for example, with a name, physical location, and/or network location such as a URL that identifies the certifying entity's internet address), or reader 1020 may know certifying entity 1060 a priori. Depending on the received information, certifying entity 1060 may attempt to either look up certificates/properties or validate certificates 1018.

If certifying entity 1060 receives the tag identifier but does not receive any certificates, then certifying entity 1060 may use the identifier to determine whether tag 1010 has any associated certificates or asserted properties. For example, certifying entity 1060 may store or have access to certificates and known tag properties, and may use the tag identifier to determine if any of the certificates and known tag properties apply to tag 1010. If certificates 1018 are provided by reader 1020, certifying entity 1060 may check certificates 1018 to determine whether they correspond to certificates known to certifying entity 1060. In some embodiments, certificates 1018 may have associated electronic signatures, and certifying entity 1060 may validate certificates 1018 by authenticating the electronic signatures.

Upon determining whether tag 1010 is associated with particular certificates or properties, or upon determining the validity of certificates 1018, the certifying entity 1060 may transmit an optional message 1034 to reader 1020. Message 1034 may include certificates or properties associated with tag 1010, or may confirm or refute certificates 1018. In some embodiments, message 1034 may be electronically signed by certifying entity 1060 via a symmetric or asymmetric cryptographic algorithm so that a recipient can verify that message 1034 is genuine (i.e., is actually from the correct certifying entity and has not been forged or altered) using the appropriate cryptographic algorithm.

In some embodiments, the messages 1022/1032 may include the physical location of reader 1020 when the challenge was issued to the tag 1010 or when reader 1020 received the tag identifier and/or certificates 1018. The messages 1022/1032 may also include a reader identifier, and/or may be signed with a reader electronic signature.

The authenticating entity 1030 and/or the certifying entity 1060 may transmit notifications 1036 and 1038, respectively, to one or more designated parties 1040 via network(s) 1050. The notification 1036 may be electronically signed by authenticating entity 1030, and may indicate whether the authenticity of tag 1010 was confirmed or refuted. Similarly, the notification 1038 may be electronically signed by certifying entity 1060, and may indicate whether tag 1010 has associated certificates or properties, or whether one or more certificates received from tag 1010 were validated. For example, a pharmaceutical distributor using an RFID-enabled handheld reader to interrogate a shipment (such as a case of medicine) may utilize an authenticating entity, which may send the reply to a designated party such as the distributor's security office or, in some instances, directly to the police in the event of counterfeit medicine. The same distributor may also utilize a certifying entity to ensure that the shipment has valid certificates indicating one or more properties (e.g., has approval from appropriate authorities, meets safety standards, or any other suitable property), and the certifying entity may notify a designated party if the shipment's certificates are invalid.

In some embodiments, authenticating entity 1030 may transmit an optional message 1030 to reader 1020 indicating whether tag 1010 has been authenticated. In other embodiments, authenticating entity 1030 may transmit a message only if tag authenticity has been confirmed, if tag authenticity has been refuted, or may not transmit a message to reader 1020 at all. Authenticating entity 1030 may also transmit a notification to designated party 1040 if the authenticity of tag 1010 has been confirmed or refuted, only if tag authenticity has been confirmed, or only if tag authenticity has been refuted.

Similarly, certifying entity 1060 may transmit an optional message 1034 to reader 1020. If reader 1020 had previously provided certificate(s) 1018, certifying entity 1060 may use message 1034 to indicate whether certificate(s) 1018 is valid. If reader 1020 only provided an identifier for tag 1010, certifying entity 1060 may include certificate(s) and/or properties associated with tag 1010 in message 1034. In some embodiments, certifying entity 1060 may transmit a message only if received certificate(s) have been validated or an identified tag has associated certificates, only if received certificate(s) have been refuted, or may not transmit a message to reader 1020 at all. Certifying entity 1060 may also transmit a notification to designated party 1040 only if received certificate(s) have been validated or an identified tag has associated certificates, only if received certificate(s) have been refuted or an identified tag does not have associated certificates, or in both cases.

As shown in diagram 1000, reader 1020, authenticating entity 1030, certifying entity 1060, and designated party 1040 communicates over one or more networks 1050. The network(s) 1050 may be available in real-time, meaning that an entity can engage with another entity on the network 1050 on a message-by-message basis, or the network(s) 1050 may be non-real-time, meaning that an entity stores or buffers its messages and transmits them to other entities when the network is available. Of course, entities may also store and transmit messages to other entities on a network that is available in real-time.

In one embodiment reader 1020 may store responses and/or certificates from multiple tags before transmitting one or more of the responses/certificates to authenticating entity 1030 and/or certifying entity 1060. In this embodiment, the reader 1020 may configure its transmissions to take advantage of batch transmission. If the reader 1020 stores responses from multiple tags to a single challenge, the reader 1020 may first transmit a subset (one or more) of the stored responses but only one copy of the challenge to the authenticating entity 1030. Subsequently, the reader 1020 may transmit more of the stored responses, but no further challenges, to the authenticating entity 1030. Similarly, if the reader 1020 stores certificates from multiple tags, it may transmit a subset (one or more) of the stored certificates in one transmission and another subset of the stored certificates in another transmission. In some embodiments, a particular stored certificate may embody assertions about more than one tag. In these embodiments, the reader 1020 may only transmit a single copy of the certificate for multiple tags, instead of transmitting a copy of the certificate for each tag.

In some embodiments the certifying entity 1060 may pre-register certificates at the authenticating entity 1030 in advance, so that the authenticating entity 1030 can act as a proxy for certifying entity 1060 and validate or refute a tag's certificates without having to communicate with certifying entity 1060. In this situation, reader 1020 may only transmit messages to authenticating entity 1030 and not to certifying entity 1060, although in some embodiments certifying entity 1060 may transmit certificates and/or certificate confirmation/refutation messages to reader 1020. Alternatively, the certifying entity 1060 may store authenticating information and act as a proxy for authenticating entity 1030, and may be able to authenticate a tag without having to communicate with authenticating entity 1030. In this situation, reader 1020 may only transmit messages to certifying entity 1060 and not to authenticating entity 1030, although in some embodiments authenticating entity 1030 may transmit tag authenticity confirmation/refutation messages to reader 1020. In other embodiments, authenticating entity 1030 and certifying entity 1060 may be the same entity.

The reader may transmit tag identifiers/challenges/responses and tag certificates in different messages, or may combine them in a single message. Similarly, the authenticating entity/certifying entity may transmit tag/certificate confirmation/refutation messages individually or as a single message. In some embodiments, the reader may transmit a reader certificate to the authenticating entity and/or the certifying entity, where the reader certificate may embody one or more assertions about the reader. For example, the reader certificate may indicate the authenticity or physical location of the reader.

Figure 11:
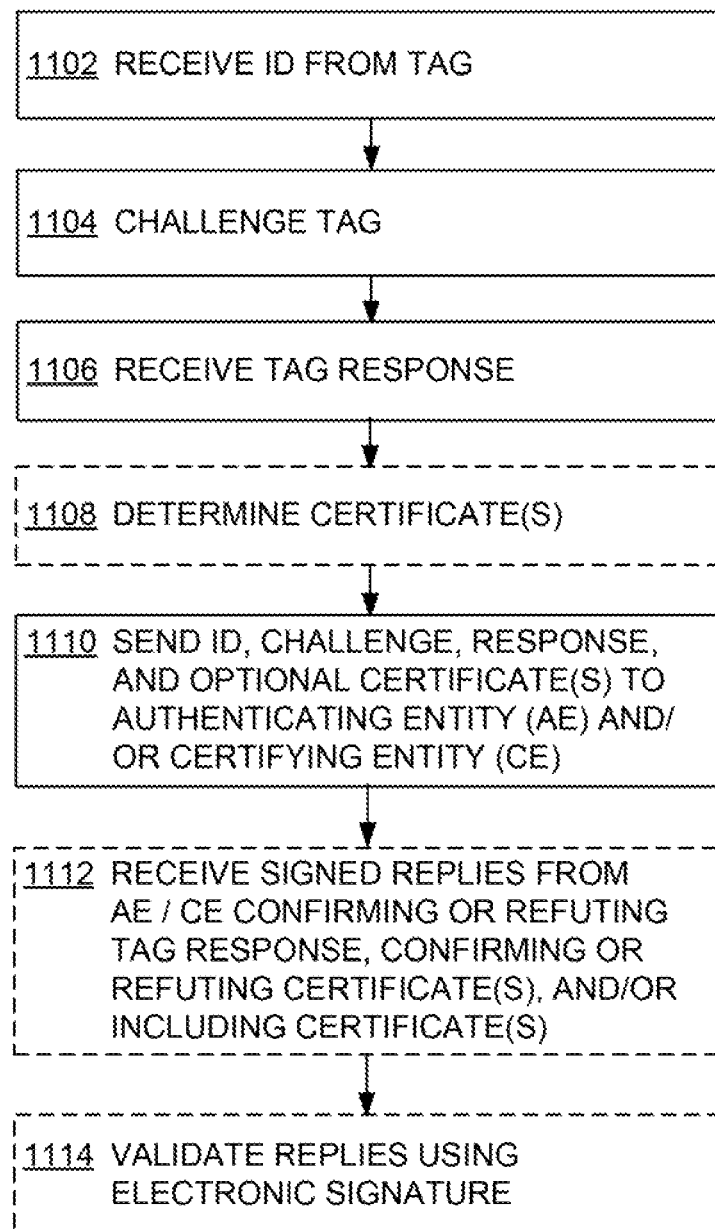
FIG. 11 is a flowchart illustrating a process for a reader authenticating a tag and validating a certificate according to embodiments.

FIG. 11 is a flowchart illustrating a process 1100 for a reader authenticating a tag and validating a certificate according to embodiments.

Process 1100 begins with step 1102, where the reader (e.g., reader 810/1020 in FIGS. 8/10) receives an identifier (e.g., identifier 1012 in FIG. 10) from a tag (e.g., tag 1010 in FIG. 10). Upon receiving the identifier, the reader challenges the tag at step 1104 (e.g., by transmitting challenge 1014 in FIG. 10) and receives a response to the challenge from the tag (e.g., response 1016 in FIG. 10) at step 1106.

In some embodiments, at optional step 1108, the reader determines one or more certificates associated with the tag. For example, the reader may receive the certificate(s) from the tag (e.g., certificate(s) 1018 in FIG. 10), or may construct the certificate(s) based on the received identifier (e.g., as described above in relation to FIG. 9). Subsequently, the reader sends the received identifier, the challenge, the tag's response to the challenge, and any determined certificate(s) to an authenticating entity (e.g., authenticating entity 1030 in FIG. 10) and/or to a certifying entity (e.g., certifying entity 1060 in FIG. 11) at step 1110. At optional step 1112, the reader may then receive electronically-signed replies from the authenticating entity and/or certifying entity. The reply from the authenticating entity may confirm or refute the tag response. If the reader determined and provided certificates to the certifying entity, the reply from the certifying entity may confirm or refute the validity of the provided certificate(s). If the reader did not provide certificates to the certifying entity, then the reply from the certifying entity may include one or more certificates associated with the tag, or may not include any certificates if no known certificates are associated with the tag. At optional step 1114, the reader may validate the received replies by checking their electronic signatures.

In the above description, an authenticating entity authenticates a tag using a challenge sent to the tag and a response received from the tag. In some embodiments, an authenticating entity may instead use the tag ID to determine tag authenticity. For example, an authenticating entity may store or have access to a database or lookup table that stores the IDs of authentic tags. To determine whether a particular tag is authentic, the authenticating entity may determine whether the ID of that tag is listed in the database or lookup table. If so, then the authenticating entity may consider the tag authentic. If not, then the authenticating entity may consider the tag counterfeit, or may perform additional authentication, for example as described above. In another embodiment, an authenticating entity may instead use information recovered from the tag—for instance a digital signature or a message authentication code—and the authenticating entity may verify the correctness of the signature or the message authentication code. If the signature or message authentication is correct then the authenticating entity may consider the tag authentic. If not, then the authenticating entity may consider the tag counterfeit, or perform additional authenticating, for example as described above.

The steps described in process 1100 are for illustrative purposes only. Network-enabled RFID tag endorsement may be implemented using additional or fewer steps and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the an. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A. B, and C together, etc.). Where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for endorsing an RFID tag, the method comprising:
    receiving an identifier from the tag;
    challenging the tag with a challenge;
    receiving a response from the tag;
    sending a first message including at least the identifier, challenge, and response to an authenticating entity;
    sending a second message including at least the identifier to a certifying entity;
    receiving a first reply from the authenticating entity;
    receiving a second reply from the certifying entity, wherein the second reply identifies a property of the tag or of an item to which the tag is affixed, the property including at least one of a production process property, an entity approval, a safety property, and a satisfaction rating; and
    endorsing the RFID tag based on at least one of the first reply and the second reply.

2. The method of claim 1, wherein sending the second message comprises:
    forming a certificate from the identifier and at least one assertion associated with the tag; and sending the second message including the certificate to the certifying entity.

3. The method of claim 1, further comprising at least one of identifying and locating one or more of the authenticating entity and the certifying entity based on information received from the tag.

4. The method of claim 1, wherein at least one of the first and second messages further includes at least one of:
a reader certificate,
a physical location for the reader, and
a reader electronic signature.

5. The method of claim 1, wherein at least one of:
the authenticating entity and the certifying entity are the same entity,
the first and second messages are combined into a single message, and
the first and second replies are combined into a single reply.

6. The method of claim 1, further comprising challenging multiple tags with the challenge simultaneously, and wherein at least one of the tags is configured to store its response for a subsequent reading by the reader.

7. The method of claim 1, wherein at least one of:
the production process property indicates one or more of country of origin, labor practices, farming practices, energy usage, and whether the item is organic, vegan, or vegetarian; and
the entity approval indicates one or more of approval by a nongovernmental organization, approval by a government, and approval by a laboratory.

8. A method for endorsing an RFID tag, the method comprising:
receiving an identifier from the tag;
challenging the tag with a challenge;
receiving a response from the tag;
authenticating the response;
sending a message including at least the identifier to a certifying entity;
receiving a reply from the certifying entity, wherein the reply identifies a property of the tag or of an item to which the tag is affixed, the property including at least one of a production process property, an entity approval, a safety property, and a satisfaction rating; and
endorsing the RFID tag based on the reply.

9. The method of claim 8, wherein authenticating the response comprises authenticating the response based on the challenge and a tag key.

10. The method of claim 9, wherein the tag key is a private key and authenticating the response comprises authenticating the response based on the challenge and a public key associated with the private key.

11. The method of claim 8, wherein the message further includes at least one of:
a reader certificate;
a physical location for the reader; and
a reader electronic signature.

12. The method of claim 8, wherein receiving the identifier and receiving the response comprises receiving the identifier concatenated with the response.

13. The method of claim 8, wherein at least one of:
the production process property indicates one or more of country of origin, labor practices, farming practices, energy usage, and whether the item is organic, vegan, or vegetarian; and
the entity approval indicates one or more of approval by a nongovernmental organization, approval by a government, and approval by a laboratory.

14. A method for endorsing an RFID tag, the method comprising:
receiving an identifier from the tag;
challenging the tag with a challenge;
receiving a response from the tag;
authenticating the response;
sending a message including at least the identifier to a certifying entity; and
receiving a reply from the certifying entity, wherein the reply identifies a property of the tag or of an item to which the tag is affixed; and
endorsing the RFID tag based on the reply.

15. The method of claim 14, wherein authenticating the response comprises authenticating the response based on the challenge and a tag key.

16. The method of claim 15, wherein the tag key is a private key and authenticating the response comprises authenticating the response based on the challenge and a public key associated with the private key.

17. The method of claim 14, wherein receiving the identifier and receiving the response comprises receiving the identifier concatenated with the response.

18. The method of claim 14, further comprising challenging multiple tags with the challenge simultaneously, and wherein at least one of the tags is configured to store its response for a subsequent reading by the reader.

19. The method of claim 14, further comprising at least one of identifying and locating the certifying entity based on information received from the tag.

20. The method of claim 14, wherein the message further includes at least one of:
a reader certificate,
a physical location for the reader, and
a reader electronic signature.

* * * * *